United States Patent [19]

Hermann et al.

[11] Patent Number: 4,841,280

[45] Date of Patent: Jun. 20, 1989

[54] VISUAL DISPLAY APPARATUS FOR INFORMATION ITEMS

[75] Inventors: Bernhard Hermann, Schoemberg; Herbert Muerdter, Albstadt; Walter Ehresmann, Albstadt; Manfred Kammerer, Albstadt, all of Fed. Rep. of Germany

[73] Assignee: August Sauter GmbH, Ebingen, Fed. Rep. of Germany

[21] Appl. No.: 84,016

[22] Filed: Aug. 11, 1987

[30] Foreign Application Priority Data

Aug. 13, 1986 [DE] Fed. Rep. of Germany ....... 3627394

[51] Int. Cl.$^4$ .............................................. G09G 3/00
[52] U.S. Cl. .................................... 340/706; 340/711; 340/791; 177/25.15
[58] Field of Search ............... 340/706, 709, 756, 711, 340/712, 365 VL, 791, 796, 815.04; 177/25.13, 25.14, 25.15, 31, 177, 178; 364/466; 368/29, 30, 241, 242

[56] References Cited

U.S. PATENT DOCUMENTS

| | | |
|---|---|---|
| 4,340,887 | 7/1982 | Dias, II . |
| 4,351,033 | 9/1982 | Uchimura et al. ............... 177/25.15 |
| 4,454,501 | 6/1984 | Butts ............................ 340/365 VL |
| 4,542,799 | 9/1985 | Komoto . |
| 4,554,988 | 11/1985 | Ludwig et al. . |
| 4,586,575 | 5/1986 | Muerdter et al. . |
| 4,631,700 | 12/1986 | Lapeyre ...................... 340/365 VL |

FOREIGN PATENT DOCUMENTS 3036002 9/1981 Fed. Rep. of Germany .
3104662 8/1982 Fed. Rep. of Germany .
3149702 7/1983 Fed. Rep. of Germany .

OTHER PUBLICATIONS

Patents Abstracts of Japan, vol. 5, 1981 No. 169, "Display Method of Digital Display Electric Balance" (authors T. Seikosho K. K. & T. Kayayama).
Patents Abstracts of Japan, vol. 8, 1984 No. 179, "Display Device of Electron Balance" (authors Shimazu Seisakusho K. K. & Yasuhiro Fujinaga).
"Siebensegment-Anzeigeeinheiten stellen Daten bitweise dar, Elektronic 1980", Heft 18, pp. 89, 90.
IBM Technical Disclosure Bulletin vol. 24, No. 1B, Jun. 1981—"Display Used For Typewriter Indicators" (author J. R. Booth).

Primary Examiner—John W. Caldwell, Sr.
Assistant Examiner—Jeffery A. Brier
Attorney, Agent, or Firm—Holman & Stern

[57] ABSTRACT

A visual display apparatus comprises a multisegment bar display (2) having display characters (16) divided into two groups. In the first group individual outer segment bars (17) are each associated with a respective permanent marking which indicates a specific information item or class of information items, and are connected in a closed cycle whereby the instantaneously actuated display can be advanced forward or backward in the closed cycle from one segment bar (17) to another by keys (4,5). A sequence of display patterns representing parameter values is displayed in the second group of display characters (16), which sequence and which set depends on the segment bar (17) which is instantaneously actuated in the first group, and a desired parameter value can be selected from among the sequence by depressing an "acceptance" key (6). The parameters for equipment can be adopted rapidly and under conditions of rapid surveyability, whereby a selection for each of a number of parameters can be made from a plurality of parameter values, so that the parameters can be set in advance of an operation phase.

22 Claims, 3 Drawing Sheets 4,841,280

VISUAL DISPLAY APPARATUS FOR INFORMATION ITEMS

BACKGROUND OF THE INVENTION

1. Field of the Invention

The invention relates to an apparatus for visual display of information items on a display field having a plurality of display elements, wherein said element are selectively actuatable for display depending on the particular information which is to be displayed.

2. Description of the Prior Art

Such apparatus are used widely, particularly in connection with electronically controlled equipment, for displaying measured quantities obtained with the aid of the equipment being controlled; and internal parameters of such equipment; whereby the user or a maintenance technician is provided with an overview of the operating states of the equipment which have been set, and/or is enabled to change these operating states.

In particular, electronically controlled scales are known which are provided with such visual display apparatus.

It is significant that such electronically controlled scales can have a modular construction, with the modules being associated with specific functions within the scale equipment as a whole, which functions include, e.g., receiving the measured quantities, converting said quantities, displaying the converted quantities, printing the quantities, etc. In this connection, it has proven to be advantageous if the individual modules themselves can be switched to processing regimes according to various parameters, e.g. various maximum loads, scale divisions, etc., whereby a large number of different scales suiting the needs of each user can be embodied in a single weighing apparatus with a small number of modules.

In order to configure such a modular scale for a specific application, it is thus necessary to select and adjust in advance the desired parameters for the individual modules, from the available range of such parameters, whereby the scale can then be operated in the regime established by the selected set of parameters. The greater the number of modules and the greater the number of parameters in the individual modules which parameters are to be adjusted, the more difficult it is in practice to call up these parameters and set them, and the more difficult it is to quickly apprehend the display.

A known approach to the selection and setting of the desired parameters is to sequentially display all the parameters of the modules on the display device. As soon as the desired parameter appears on the display, the operator depresses a response key which causes the electronic control system to recognize the parameter just displayed, for final setting. This technique has the disadvantage that it does not provide a quick and manageable overall view of the setting process or setting sequence, because only a single parameter from the entire set is displayed at a given time. Further, the sequence takes a long time to run through if there are numerous modules and numerous parameters which require setting.

Of course, it is known to employ video display terminals (VDTs) for the dialog with a user, with the advantage that a substantial number of items of information (numbers, text, and graphic symbols) can be displayed at once. However, VDTs take up too much space and are too costly, for many applications, and therefore an alternative is required.

BRIEF SUMMARY OF THE INVENTION

The object of the present invention is to provide a structurally simple visual display apparatus of the type described above, which enables a quick overview of an entire set of information items, and more particularly to not only provide quick surveyability but also quick and simple selection of items from the total set of items to be displayed.

This object is achieved according to the invention by, particularly, an apparatus for visual display of information items on a display field comprising a multisegment bar display wherein the segments are selectively actuatable depending on the individual information items to be displayed; characterized in that the individual segments in said field are each associated with a respective permanent marking which indicates the specific information item, so that to display one of the information items the segment corresponding to the respective marking can be actuated. This arrangement enables a simple multisegment bar display to be employed for a quickly surveyable display of the entire set of required information items. Such displays ordinarily are used only for display of a single, short, coherent information item comprising, e.g., a few numbers and/or letters; but the number of items displayable essentially simultaneously by a single multisegment bar display is greatly increased according to the invention by indicating different items via permanent markings applied to the display field. The information item being instantaneously displayed is indicated by turning on a single segment associated with the indicative marking. The user can see at a glance, via the permanent markings, the total number of information items surveyable. The particular segment instantaneously turned on indicates to the user what information item is instantaneously being called up or being selected, i.e., accepted. In this way a dialog can be conducted of a type which would otherwise require VDTs, which are much more expensive.

If the visual display device comprises (as is usual) a block comprising a plurality of linearly arrayed alphanumeric display characters, it is provided according to an advantageous embodiment of the invention that the markings are associated with the segment bars on the outer boundary of the block. This has shown itself to be advantageous because the outer segments adjoin the free surface of the display field, where there is ample space available for applying the markings directly adjacent the outer segments. For example, these markings may each comprise a single ordinary word which characterizes the information item to be displayed Further, according to a refinement of the invention it is advantageous for the permanent markings to be disposed on a mask which can be applied to the multisegment bar display. By changing masks, a practically unlimited number of information items may be associated (in sets) with the segments, whereby the display is coordinated with the mask which is instantaneously in place, and a large number of information items are thereby displayed and processed in a manner enabling quick apprehension.

In another advantageous embodiment, the segments associated with the markings are connected in a closed cycle, whereby a switching progression from one to the next is accomplished by an "advance" signal. A forward direction of progression through the cycle is established and the user can see the entire course of the dialog at a glance, which course comprises steps already passed through, the present step, and future steps.

Although advantageously the above-described embodiments make use of a multisegment bar display for representing characters, the invention is not limited to this type of visual display device. The invention admits of a visual display device for information items, which device comprises a display field with a plurality of display elements which are selectively actuatable depending on the individual information items which are to be displayed; characterized in that the set of said display elements is divided into at least two groups, in the first of which individual display elements in the display field are each associated with a respective permanent marking which characterizes a specific information item, i.e. characterizes a specific category of information items, and in the second of which the display elements are actuated depending on prescribed display patterns of, i.e. depending on display patterns established to correspond to, the instantaneously actuated display element of the first group.

Thus, in the above-described embodiments the individual display elements of the first group (which in particular may be segment bars) may each be employed to indicate a specific information item, i.e. a specific class of information items via the information durably indicated by the permanent markings, i.e. by the permanent marking associated with the display element. At the same time, the display elements of the second group give display patterns which are a function of the respective instantaneously actuated display elements of the first group. If, e.g. in the case of an electronic scale, an individual display element in the first group corresponds to the maximum load of the scale, which maximum load is to be set in advance, the various numerical values of the maximum load are given in the display patterns of the display elements of the second group.

The inventive concept is refined in an apparatus, for visual display of information items, which is furnished with an input keyboard coupled to the visual display device, such that said keyboard has an "advance" key which sequentially actuates the display elements associated with the respective markings on the display device. This enables an interactive dialog with the user. For example, with an electronic scale, the user can depress the "advance" key to advance from actuation of the instantaneously actuated display element, e.g. representing the setting of the maximum load, to actuation of the next display element, e.g. representing the selection of the units of measure.

It is advantageous for the interactive qualities of the system if the input keyboard is supplied with an "acceptance" key whereby a selection signal can be generated for accepting the instantaneously displayed pattern which is displayed on the second group of display elements. For example, with an electronic scale. if the S1 display element corresponding to the marking "Maximum load" is instantaneously actuated in the first group of display elements, a desired value for the parameter "maximum load" can be selected by depressing the "acceptance" key, namely the value instantaneously displayed by the second group of display elements. This effects pre-setting of the said value.

In this connection, an advantageous option is afforded in that the prescribed set of display patterns of the second group of display elements may be actuated in succession automatically at a prescribed speed. The selectable parameter values are then displayed to the user at a moderate rate and he may select the one desired.

In a further refinement of the invention, the input keyboard may be provided with a switching key whereby the "advance" key is switched between an operating state in which it effects advance (actuation) of the display elements in the first group and a second operating state in which it effects advance (actuation) of the prescribed display patterns for the display elements in the second group. In this way, the dialog which takes place automatically in the above-described embodiment is controlled by the user; and, according to an additional feature, the direction of progression of the dialog may be controlled to be either forward or backward.

It is further provided within the scope of the invention that the inventive apparatus has a storage device which can store, in each instance, a storage signal representing the display element which is instantaneously actuated in the first group of display elements, along with a second storage signal representing the display pattern of the second group of display elements, which display pattern has been selected via the "acceptance" signal. In this way, the result of the choice made in the dialog can be ultimately (and permanently, if so desired) stored in the storage device in the form of two mutually associated storage signals, to be made available as a callable set of operating parameters for an electronic scale.

Finally, it is further provided within the scope of the invention that the display device is coupled to a scale each of the modules of which has a number of parameters which can be set, whereby the first group of display elements indicates the instantaneously selected module the parameters of which are undergoing setting, and the second group of display elements indicates the instantaneously selectable parameter value relating to said module.

BRIEF DESCRIPTION OF THE DRAWINGS

Other features, details, and advantages of the invention will be apparent from the following detailed description with reference to the accompanying drawings wherein.

DETAILED DESCRIPTION OF THE DRAWINGS

Figure 1:
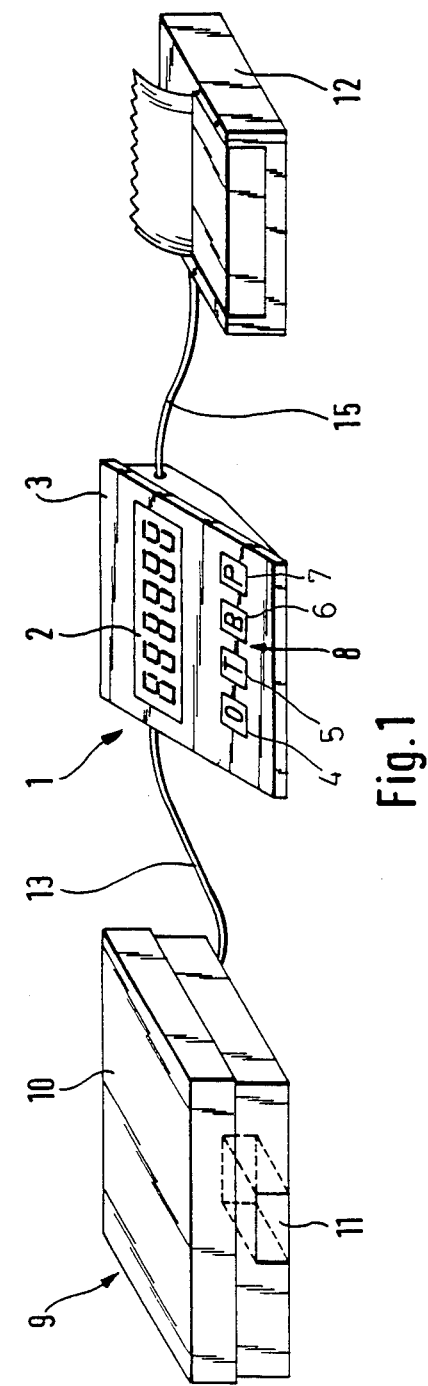
FIG. 1 is a schematic perspective view of an electronic scale with a visual display device.

KEY to FIG. 1: (a) Units of weight; (b) Maximum load; (c) Scale division; (d) Filter; (e) Output speed; (f) Interface baud rate; (g) Parity; (h) Bits per character; (i) Handshake; (j) Printer; (k) Date; (1) Weighing.

According to FIG. 1, an apparatus 1 for visual display of information items has a display field 2 (FIG. 2) on its inclined front surface 3, and a keyboard 8 comprising four keys 4, 5, 6, 7. As seen from FIGS. 1 and 3, the apparatus 1 is a module in a modularly constructed electronic scale which also has a scale 9 provided with a load receiver 10, a load sensor 11 and a printer 12, as other modules. The scale 9 is connected to a microprocessor 14 (shown schematically in FIG. 3) via an interface and a signal connector 13. Printer 12 is also connected to microprocessor 14 via an interface and a second signal connector (conductor) 15.

Figure 2:
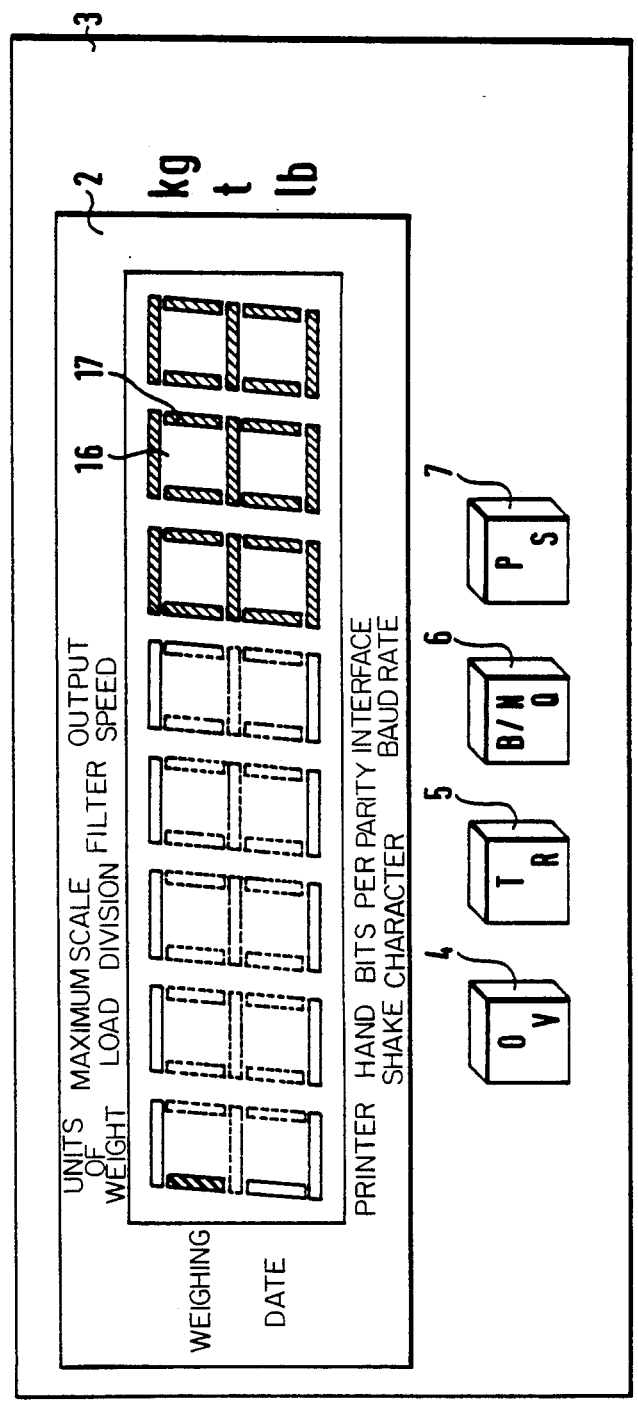
FIG. 2 is an enlarged top plan view of the display field of a visual display device usable with the apparatus of FIG. 1.
Figure 3:
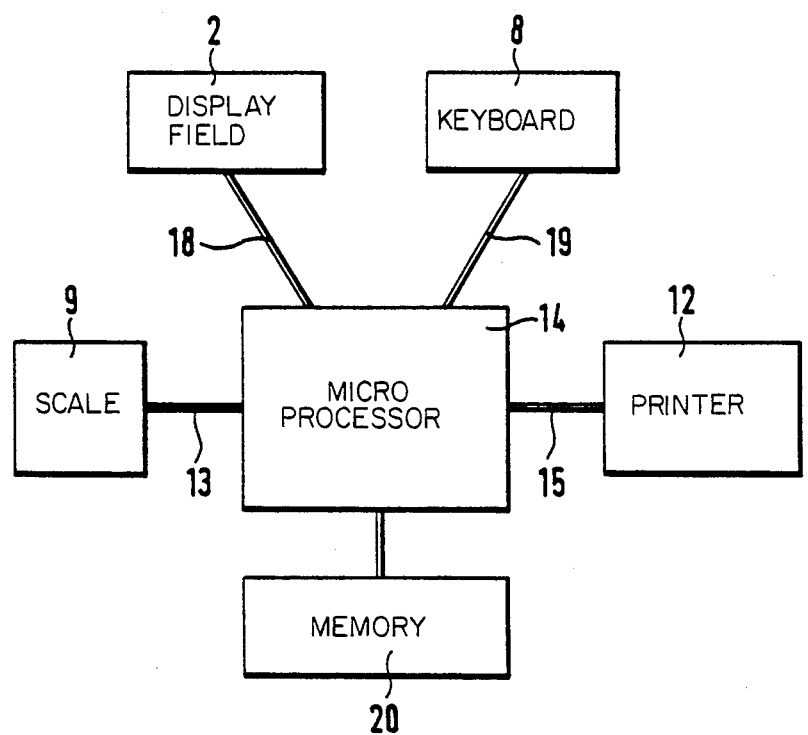
FIG. 3 is a block circuit diagram of the electronic scale illustrated in FIGS. 1 and 2.

As seen in particular from FIG. 1, the display field 2 has a six-character seven-segment bar display but may, as seen from FIG. 2, have an eight-character seven-segment bar display, wherein seven selectively actuatable segments 17 are present for each of eight alphanumeric display characters 16. In particular, for each character, three of the segments 17 extend horizontally with a vertical separation, and the other four segments 17 extend vertically between the ends of respective pairs of horizontal segments 17. As indicated schematically in FIG. 3, the segments 17 are selectively actuated by the microprocessor 14 via a signal link 18. As will be described in more detail infra, the command input governing the selective actuation of the segments 17 is via the keyboard 8, which is also linked to the microprocessor 14 via a signal link 19 (FIG. 3).

The scale 9 has its own microprocessor which enables the setting of various parameters of the scale 9 via input through the signal link 13. Thus, the units of measure in which the weight measurement is to be expressed can be selected among kg, metric, and lb, via input through link 13. The maximum load (e.g. 50, 100, 200, and 500) can also be selected by the same means, as can the scale division for the display, 5, 10, 20, or 50. It is also possible to switch between electrical filters for determining the measured value by finding the mean of fluctuations, e.g. to switch between filters "1-3". It is further possible to pre-set the output speed of the scale 9, whereby, e.g., one may choose between speeds of 1, 2, and 5 values per second.

The parameters of the interface between the apparatus 1 and the printer 12 may also be set. Thus baud rates of 1200, 2400, 4800, and 9600 may be selected for the transmission speed. For parity checking, an even or odd parity bit may be chosen, or no parity bit. The bit length of a character may be chosen as 6, 7, or 8. Finally, the "handshake" parameter is provided, to select or deselect a handshaking mode.

A parameter of the printer 12 provides a choice between formatted and unformatted output. Formatted output consists in printing each sequential weight value following a change in load, whereby said weight values are printed in respective sequential columns. Unformatted output may comprise printing the following, on successive lines: date, sequence number, associated character (descriptive code for the transaction), gross weight, tare weight, and net weight. The date may include day, month, and year.

The abovementioned five parameters of the scale device (units, maximum load, scale division, filter, and output speed), four parameters of the connection between the apparatus 1 and the printer 12 (baud rate, parity, bits per character, and handshake), the printing format parameters (printer), inscribed in FIG. 2, and the date information (date), are marked on the display field 2 in catchword form, to permanently provide identification for the respective parameter quantities. In particular, for this purpose the eight characters 16 of the display field 2 are divided into two groups, one of which comprises the five leftmost characters and the other the three rightmost characters. The markings "Units of weight", "Maximum load", "Scale division", "Filter", and "Output speed" are applied directly above the top horizontal segments 17 of the first through fifth from left display characters, respectively. The markings "Printer", "Handshake", "Bits per character", "Parity", and "Interface baud rate" are applied directly below the bottom horizontal segments 17 of the first through fifth from left display characters, respectively. The marking "Date" is applied in the space on the left next to the left lower vertical segment 17 of the leftmost character 16, and the marking "Weighing" is applied on the left above the marking "Date" and next to the left upper vertical segment 17 of the leftmost character 16. Thus, the markings are applied near corresponding outer segments 17 of one, i.e. the left, group of display characters 16.

In a normal weighing operation, the key 4 is associated with the function "zero-position", the key 5 with the function "tare", the key 6 with the function "toggle between gross and net", and the key 7 with the function "print". The microprocessor 14 controls the display characters 16 of the field 2 in such a way that the gross/net and tare values are displayed automatically. A special command to the microprocessor 14, e.g. via actuation of a key switch (not shown), by entry of a code, or by unplugging apparatus 1 from the scale 9 by unplugging a plug connection on signal link 13, causes the microprocessor 14 to change to a mode other than normal weighing, in which other mode the control sequence can be governed by keys 4-7 which now have new functions. Under these conditions the segments 17 of the first (leftmost) group of display characters 16, which segments are associated with the above-described set of markings, are connected in a closed cycle in which first (when this mode is actuated) the segment 17 associated with the marking "Weighing" is switched on for display, as shown in FIG. 2. By depression of key 4 (marked o the bottom "V" for "forward"), the microprocessor 14 switches display to the next segment 17 in the cycle, the segment associated with the marking "Units". At the same time, the display characters in the second (rightmost) group of display characters 16 are actuated in consequence of the actuation of the said "Units" segment, whereby these characters display a sequence of display patterns indicating the parameter values which may be selected for the parameter "Units".

In particular, the control process may be set up such that the display patterns in the second group of display characters 16, which patterns indicate the parameter values which may be selected, are displayed in sequence at a predetermined speed, whereby an acceptance key 6 (with bottom part marked "Q" for "acceptance") is depressed, generating a selection signal leading to the selection of the parameter value which has just been displayed. Alternately, one may provide for manual sequential switching (to the next in sequence) of the parameter values, i.e. of the display patterns indicating the parameter values in the second group of display characters 16, which is accomplished by depressing the switching key 7 (having bottom part marked "S", for "switching"). In this way the advance key 4 (as described for switching the segment display forward in the first group of display characters 16) is activated such that the display patterns in the second group of display characters 16 can be switched on sequentially by repeated depression of key 4. Similarly, the key 5 (marked "R" on the bottom, for "backward") enables backward switching of the segments in the closed cycle (in the direction opposite to that effected by key 4), and after depression of the switching key 7 the said key 5 acts on the display patterns in the second group of display characters 16 (also in the direction opposite to that effected by key 4).

For example, in the second group of display characters 16 the parameter value "kg" is first displayed. Then after key 7 is depressed, followed by key 4, the next parameter value "t" is displayed. Assume that tonne (metric) is the unit of weight desired. It can be selected by depressing the acceptance key 6. As a result there will be an automatic advance of switching to the next segment in the closed cycle in the first group, namely the segment associated with the marking "Maximum load". At the same time, operation of the advance and backward keys 4,5 is switched to affect the closed cycle of the first group of elements. In the second group of display characters 16 the display pattern "50" is displayed, corresponding to the first selectable parameter for the maximum load. Assume that this value is desired. The first value is established in advance as the default value, which does not need to be accepted by depressing key 6; accordingly, by depressing key 4 control can be advanced to the next parameter, "Scale division".

In this manner, all the parameters are eventually set to the desired values. The final setting comprises inputting of the date (the parameters values for the day, month, and year), accomplished by stepwise increasing or decreasing for each such parameter the three-position second group of characters 16. After acceptance via key 6, the segment associated with the marking "Weighing" is again switched on. If key 4 is now depressed, the progression of control through the closed cycle can be repeated, with the parameter values which have been set in the second group of display characters 16 being redisplayed concomitantly with actuation of the respective segments in the first group so that the operator can check them.

If all settings are found to be correct in this check, the acceptance key 6 is depressed with the segment "Weighing" being on. This generates store signals which cause the microprocessor 14 to store a suitable representation of the parameter designations and the selected values for said parameters, in a storage device 20 (FIG. 3), in a non-volatile state; whereupon control is transferred to the weighing mode proper.

In the above-described exemplary embodiment, the parameter values in the second group of display characters 16 were displayed in alphanumeric form. Alternatively, it is possible, similarly to the first group of display characters, to associate individual markings (designating the parameters) with individual segment bars of the display characters 16. It is also possible to employ other types of display devices than multisegment bar displays, which devices have individual display elements which may be actuated similarly to the segments of the multisegment bar displays.

In the above-described exemplary embodiment the individual parameter designations may be applied as a catchword mask on display field 2. This can be advantageous in particular if the number of such parameter designations is large. In such a case, a first mask will have only a few parameter designations, in a vertical array, whereby the microprocessor 14 will operate so that when one of these parameter designations is chosen the control will pass to a second level in which other parameter designations are associated with the controlled segments, and a second mask with corresponding other markings can be applied. In the same manner, this control sequence can pass to additional levels. The number of controllable segments, or display elements which are involved, can be different in the different control levels. In particular, the later levels may have an option or possibility of control returning to the first level.

In the above-described exemplary embodiments, the use of the apparatus 1 in connection with a scale has been described. Quite obviously, however, it may be used with any device, particularly a measuring device, which requires a "configuration", i.e. a prior setting of a set of desired values of various parameters.

As mentioned above, the electronic scale system is modularly constructed, whereby in the exemplary embodiment illustrated one module comprises the scale 9 and a second module comprises the printer 12. Both of these modules are furnished with digital interfaces which deliver their output signals in standard digital form. In this regard, it is possible to make the data and command flow from and to the modules independent of the operative physical principles of said modules. For example, the output signal from the scale 9 will be independent of the physical principle by which the load sensor 11 operates, e.g. the principle of a string cell, strain gauge, or electrodynamic sensor. Accordingly, the module delivers a generally already calibrated measurement quantity which is available at the standard interface in digital form. This leads to a simple structure of the individual modules as well as standardized processing characteristics for their adjustable parameters, thereby simplifying the setting process and making it easier to monitor and manage.

In this connection, each module is provided with a recognition code which enables selective communication with the different modules. The interface of each module has an input for standard control commands whereby the pre-set values of the parameters, e.g. maximum load, scale division, baud rate, etc., are called up in the various modules.

The various modules 9,12 are coupled to the microprocessor 14 via their individual interfaces FIG. 1,3). The microprocessor 14 controls the data and command flow from and to the modules 9,12.

We claim:

1. An apparatus for visual display of information items on a display field of a multisegment bar display, wherein the segment bars of said display are selectively actuatable for display depending on the particular information item which is to be displayed, comprising:
   a display field;
   a multisegment bar display of individual of individual segment bars arranged on said display field to form a plurality of alphanumeric characters linearly arrayed in a block within said display field; and
   permanent markings on said display field, each permanent marking indicating a specific information item;
   a plurality of said individual segment bars forming said alphanumeric characters also being operatively associated with corresponding ones of said permanent markings, so that actuation of an individual segment bar displays the respective information item of the corresponding permanent marking.

2. An apparatus as claimed in claim 1 and further comprising:
   a mask removably positionable on said multisegment bar display, said permanent markings being disposed on said mask.

3. An apparatus as claimed in claim 1 wherein:
   said segment bars are connected in a closed cycle; and advance signal means for producing a switching progression from one segment bar to the next segment bar is said cycle.

4. An apparatus as claimed in claim 1, wherein:
said block has a boundary formed by some of said segment bars; and
said markings are associated with said segment bars which form said boundary of said block.

5. An apparatus as claimed in claim 4 and further comprising:
a mask removably positionable on said multisegment bar display, said permanent markings being disposed on said mask.

6. An apparatus as claimed in claim 5 wherein:
said segment bars are connected in a closed cycle; and
an advance signal means is provided to produce a switching progression from one segment bar to the next segment bar in said cycle.

7. An apparatus as claimed in claim 1 wherein:
said apparatus comprises a modular construction having individual modules which produce output signals corresponding to respective information items; and
each module has a digital interface for producing said output signals in standardized digital form.

8. An apparatus as claimed in claim 7 wherein:
said digital interface of each module has an input for standardized control commands.

9. An apparatus as claimed in claim 7 and further comprising a microprocessor coupled to said modules through said digital interface for controlling data and command flow.

10. An apparatus for visual display of information items on a display field of a multisegment bar display, wherein the segment bars of said display are selectively actuable for display depending on the particular information which is to be displayed, comprising:
a display field;
a multisegment bar display of individual segment bars arranged on said display field to form a plurality of alphanumeric characters linearly arranged in a block within said display field; and
permanent markings on said display field, each permanent marking indicating a specific information item;
a first plurality of said individual segment bars forming said plurality of alphanumeric characters also being each operatively associated with respective permanent markings characterizing specific catagories of information whereby actuation of an individual bar within said first plurality displays respective information of the corresponding permanent marking.

11. An apparatus as claimed in claim 10 and further comprising:
an input keyboard coupled to said display field; and
an advance key on said keyboard for sequentially actuating said display elements.

12. An apparatus as claimed in claim 11 and further comprising:
an acceptance key on said keyboard for generating a selection signal for accepting the instantaneously displayed pattern displayed on said second group of display elements.

13. An apparatus as claimed in claim 12 and further comprising:
a storage device for storing, in each instance, a first storage signal representing the display element which is instantaneously actuated in said first group of display elements, and a second storage signal representing the display pattern of said second group of display elements, which display pattern has been accepted via said selection signal.

14. An apparatus as claimed in claim 13 and further comprising:
a scale coupled to said display field, said scale having modules, each module having a plurality of parameters; and
means for setting said parameters so that the first group of display elements indicates the instantaneously selected module representing the parameters selected for setting, and the second group of display elements indicates the instantaneously selectable parameter value relating to said module.

15. An apparatus as claimed in claim 14 and further comprising:
a recognition code assigned to each module so that said modules are selectively accessible.

16. An apparatus as claimed in claim 12 and further comprising:
means for automatically actuating in succession the prescribed display patterns on said second group of display elements at a prescribed speed.

17. An apparatus as claimed in claim 11 and further comprising:
a switching key on said keyboard for switching said advance key between an operating state in which it effects actuation of the display elements in said first group and a second operating state in which it effects actuation of prescribed display patterns for the display elements in said second group.

18. An apparatus as claimed in claim 17 and further comprising:
a storage device for storing, in each instance, a first storage signal representing the display element which is instantaneously actuated in said first group of display elements, and a second storage signal representing the display pattern of said second group of display elements, which display pattern has been accepted via said selection signal.

19. An apparatus as claimed in claim 10 and further comprising:
means for automatically actuating in succession the prescribed display patterns on said second group of display elements at a prescribed speed.

20. An apparatus as claimed in claim 19 and further comprising:
a switching key on said keyboard for switching said advance key between an operating state in which it effects actuation of the display elements in said first group and a second operating state in which it effects actuation of prescribed display patterns for the display elements in said second group.

21. An apparatus for visual display of information item on a display field of a multisegment bar display, wherein the segment bars of said display are selectively actuable for display, comprising:
a display field;
a multisegment bar display of individual segment bars arranged on said display field to form a plurality of alphanumeric characters within said display field with each of said individual segment bars forming an integral part of said alphanumeric characters; and
permanent markings on said display field, each permanent indicating a specific information item;

a plurality of said individual segment bars forming said alphanumeric characters is also being operatively associated with corresponding ones of said permanent markings, whereby actuation of an individual segment bar displays the respective information item of the corresponding permanent marking.

22. An apparatus for visual display of information items on a display field of a multisegment bar display, wherein the segment bars of said display are selectively actuatable, comprising:

a display field;

a multisegment bar display of individual segment bars arranged on said display field to form a plurality of alphanumeric characters within said display field with each of said individual segment bars forming an integral part of said alphanumeric characters; and permanent markings on said display field, each of said permanent markings indicating a specific information item;

a first plurality of said individual segment bars forming said plurality of alphanumeric characters also being each operatively associated with respective permanent markings characterizing specific catagories of information whereby actuation of an individual bar within said first plurality of individual segment bars displays the respective information of the corresponding permanent marking while a second plurality of said individual segment bars forming said plurality of alphanumeric characters may be actuated to produce instantaneous display patterns in conjunction with information represented by said individual bar within said first plurality.

* * * * *